(12) United States Patent
Vermeys et al.

(10) Patent No.: US 9,623,823 B2
(45) Date of Patent: Apr. 18, 2017

(54) NERF BAR FOR UNIBODY VEHICLES

(71) Applicants: Paul Vermeys, Queen Creek, AZ (US); Javier Nolasco, Phoenix, AZ (US)

(72) Inventors: Paul Vermeys, Queen Creek, AZ (US); Javier Nolasco, Phoenix, AZ (US)

(73) Assignee: U-Haul International, Inc., Phoenix, AZ (US)

( * ) Notice: Subject to any disclaimer, the term of this patent is extended or adjusted under 35 U.S.C. 154(b) by 0 days.

(21) Appl. No.: 14/817,461

(22) Filed: Aug. 4, 2015

(65) Prior Publication Data

US 2016/0059811 A1    Mar. 3, 2016

Related U.S. Application Data

(60) Provisional application No. 62/044,833, filed on Sep. 2, 2014, provisional application No. 62/044,127, filed on Aug. 29, 2014.

(51) Int. Cl.
| | |
|---|---|
| *B60R 19/00* | (2006.01) |
| *B60R 19/42* | (2006.01) |
| *B60R 19/24* | (2006.01) |
| *B60R 3/00* | (2006.01) |

(52) U.S. Cl.
CPC .............. *B60R 19/42* (2013.01); *B60R 3/002* (2013.01); *B60R 19/24* (2013.01)

(58) Field of Classification Search
CPC .......... B60R 19/42; B60R 3/002; B60R 19/24
USPC ........................... 293/126, 128; 280/169, 163
See application file for complete search history.

(56) References Cited

U.S. PATENT DOCUMENTS

| | | |
|---|---|---|
| 1,783,934 A | 12/1930 | Banschbach |
| 2,594,491 A | 4/1952 | Persons |
| 4,203,611 A | 5/1980 | Makela |
| 4,217,715 A | 8/1980 | Bryan, Jr. |
| 4,943,085 A | 7/1990 | Straka |
| 5,382,035 A | 1/1995 | Waddington et al. |
| 6,910,700 B2 | 6/2005 | Kayne |
| 8,528,925 B2 | 9/2013 | McFarlane |
| 2003/0006575 A1 | 1/2003 | Genis et al. |
| 2003/0178805 A1 | 9/2003 | Elrod |
| 2007/0296175 A1 * | 12/2007 | Flajnik .................... B60R 3/002 280/169 |

* cited by examiner

*Primary Examiner* — Joseph D Pape
(74) *Attorney, Agent, or Firm* — Richard E. Oney; Tiffany & Bosco, P.A.

(57) ABSTRACT

A nerf bar assembly for mounting to the side of a vehicle having a unibody construction includes a tubular member comprising a tubular section and a plurality of mounting brackets fixed to and projecting generally perpendicularly from the tubular section. A support structure is configured for mounting to the body of a vehicle having a unibody construction. The support structure forms a channel and includes a plurality of channel veins and a plurality of support structure brackets disposed within the channel. The support structure brackets are configured so that the plurality of tubular member mounting brackets can be removably mounted to the plurality of support structure brackets. The nerf bar assembly is configured so that when the tubular member impacts an object, the tubular member can collapse and absorb the impact before damage occurs to the support structure or the vehicle body.

22 Claims, 16 Drawing Sheets

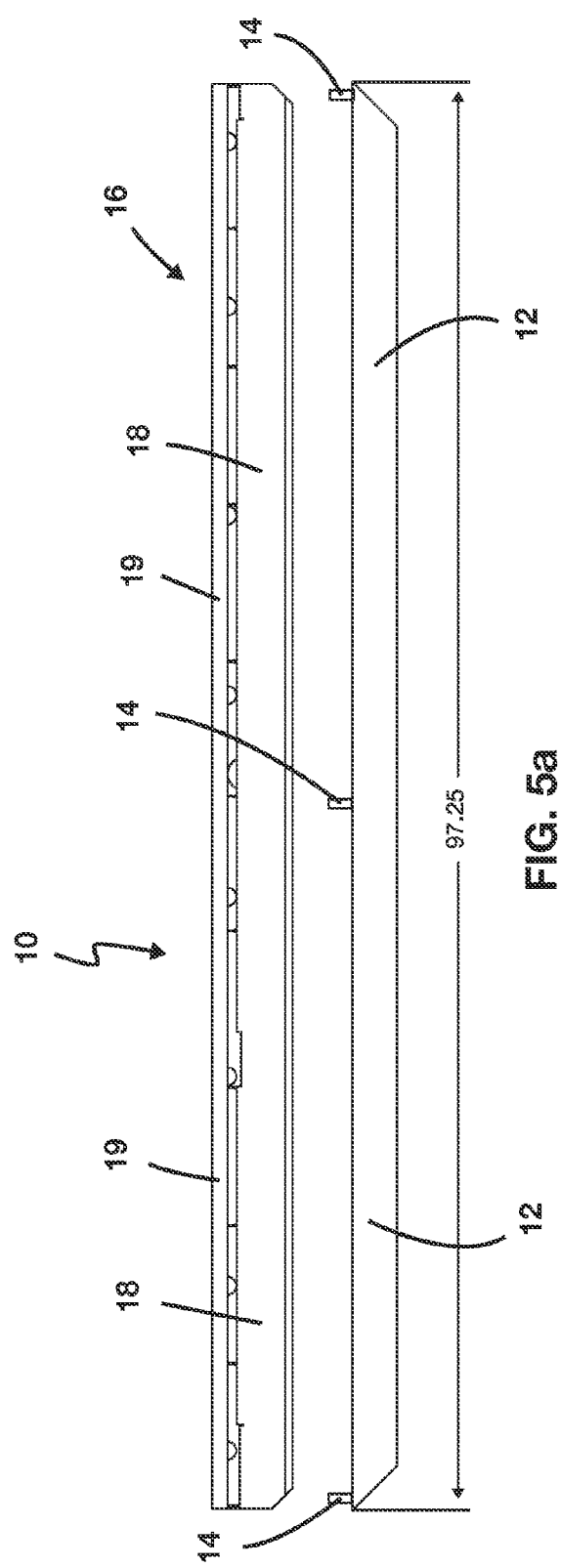
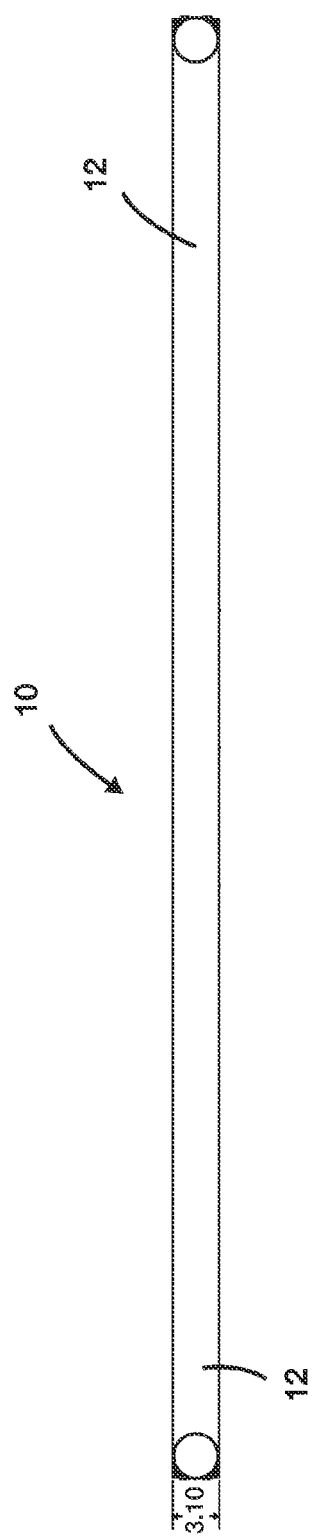
FIG. 5a
FIG. 5b

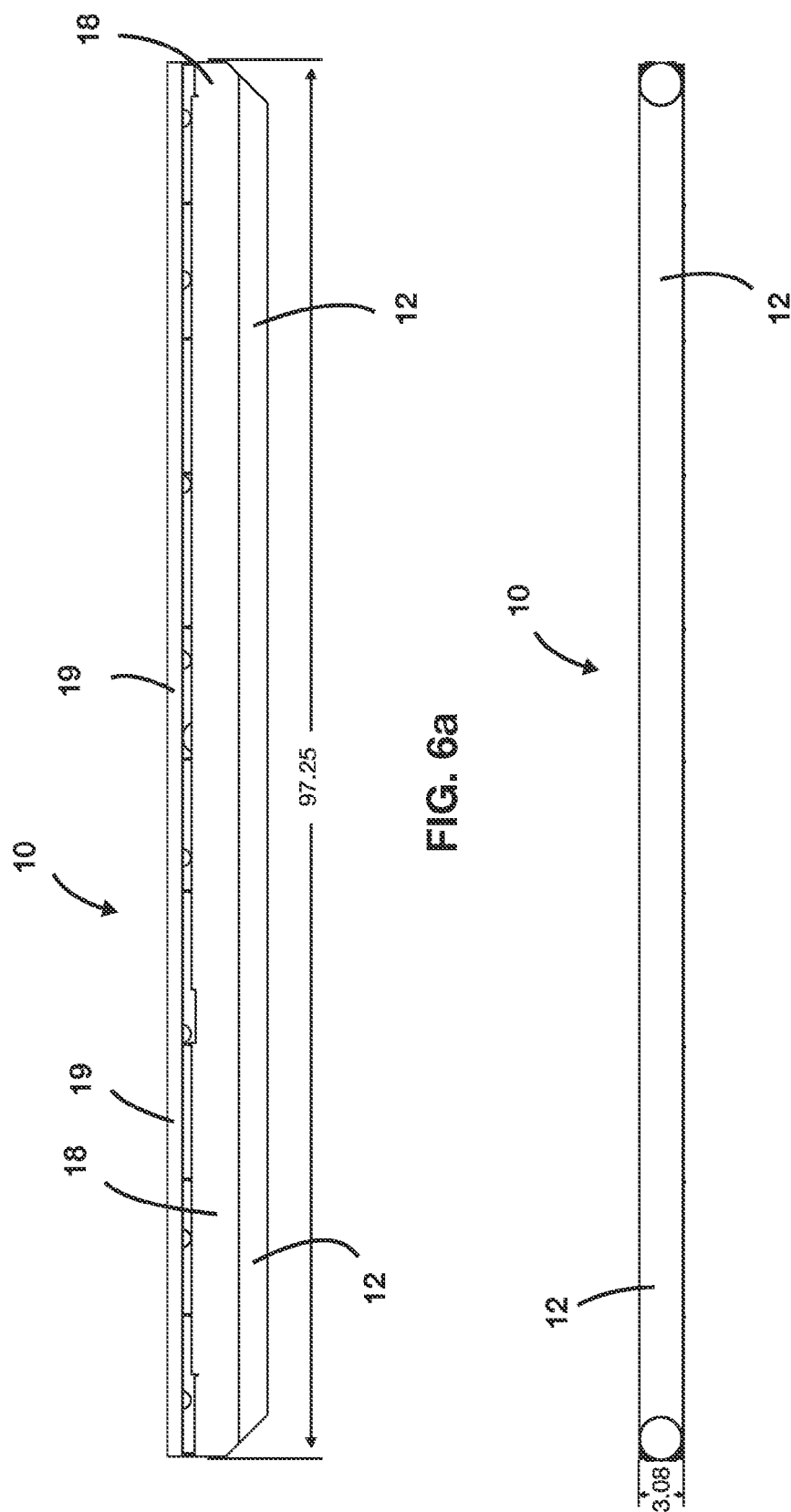

NERF BAR FOR UNIBODY VEHICLES

RELATED APPLICATIONS

This application claims priority of, and incorporates by reference, U.S. provisional patent application Ser. No. 62/044,127, filed Aug. 29, 2014, and U.S. provisional patent application Ser. No. 62/044,833, filed Sep. 2, 2014, both entitled Nerf Bar for Unibody Vehicles.

BACKGROUND

This invention relates generally to nerf bars for mounting to the side of vehicles to help prevent damage to the vehicle. More particularly, it relates to a nerf bar that can be mounted to a vehicle that has a unibody construction.

Nerf bars have been used to protect the sides of vehicles, such as sport utility vehicles, trucks and vans, from damage and to provide a step to assist an occupant when entering or leaving the vehicle. Frequently, such nerf bars also are employed as a decorative feature to enhance a vehicle's appearance. Nerf bars usually are produced to fit a specific vehicle and are mounted to the rigid frame of the vehicle. In vehicles utilizing body-on-frame construction, the frame is made of steel and designed so that the body of the vehicle is mounted on top of the rigid frame. Because trucks frequently employ this type of construction, prior art nerf bars have been designed to be mounted to such frames.

In contrast to body-on-frame construction vehicles, unibody frames are stamped out as part of the vehicle structure. Although body-on-frame is the preferred construction method for heavy-duty commercial vehicles (especially those intended to carry or pull heavy loads, such as trucks, vans and some sport utility vehicles), a trend is developing towards utilizing unibody construction for some of these vehicles. For example, the Ford Transit van has unibody construction. However, existing nerf bar designs for body-on-frame vehicles cannot be used for unibody construction vehicles. Such nerf bars mount to a large C-channel frame member, which is located roughly 20 inches from where the nerf bar is positioned. This creates a large lever, which requires a strong attachment point and frame to support the load. A unibody frame, however, consists of much lighter materials. Consequently, installing a nerf bar to a unibody frame using the technique described above would likely result in deformation of the body at the attachment points.

It is an object of the present invention, therefore, to provide a nerf bar that can be used on vehicles of unibody construction to provide protection from damage to the vehicle body during a side-impact collision with an object such as a pole.

Another object of the invention is to provide such a nerf bar that can be relatively easily removed and replaced if the bar is damaged.

Still another object of the invention is to provide such a nerf bar that can be mounted to the body of a vehicle of unibody construction with minimal modification or drilling of the body so as not to affect the integrity of the body.

Yet another object of the invention is to provide such a nerf bar that is not left or right-side specific, i.e. that can be used on either side of a vehicle.

Additional objects and advantages of the invention will be set forth in the description that follows, and in part will be apparent from the description, or may be learned by practice of the invention. The objects and advantages of the invention may be realized and obtained by means of the instrumentalities and combinations pointed out in the appended claims.

SUMMARY

To achieve the foregoing objects, and in accordance with the purposes of the invention as embodied and broadly described in this document, there is provided a nerf bar assembly for mounting to the side of a vehicle having a unibody construction. The nerf bar assembly includes a tubular member and a support structure defining a longitudinal channel and configured for mounting to the body of a vehicle having a unibody construction. The support structure includes at least one channel vein disposed within the channel, and the tubular member is configured for mounting to the support structure so that a portion of the tubular member is disposed within the channel and adjacent the channel vein. The assembly is configured so that when the tubular member impacts an object, the tubular member can collapse and absorb the impact before damage occurs to the support structure or the vehicle body. Preferably, the tubular member is removably mounted to the support structure.

In one advantageous embodiment, the nerf bar assembly includes a tubular member having a tubular section and a plurality of mounting brackets fixed to and projecting generally perpendicularly from the tubular section. The support structure includes a channel top portion, a channel bottom portion, and a plurality of channel veins attached to the channel top portion and the channel bottom portion and disposed within the channel. The support structure also includes a plurality of support structure brackets disposed within the channel and configured so that each of the plurality of tubular member mounting brackets can be mounted to a corresponding one of the plurality of support structure brackets. Each of the plurality of tubular member mounting brackets can be removably mounted to the corresponding one of the plurality of support structure brackets. The assembly is configured so that it can be mounted to either side of the vehicle body without modifying the assembly. When the support structure is attached to the vehicle body and the tubular member is mounted to the support structure, the outermost portion of the tubular member is disposed less than about six inches outward from the outermost point where the support structure attaches to the vehicle body.

In these configurations, the nerf bar assembly of the present invention can protect the vehicle's body and frame from damage during a side impact collision. The nerf bar assembly decreases the chance of vehicle body or frame damage by using the tubular member as a sacrificial member that absorbs energy and collapses before damage occurs to the support structure or vehicle body.

BRIEF DESCRIPTION OF THE DRAWINGS AND APPENDIX

The accompanying drawings, which are incorporated in and constitute a part of the specification, illustrate the presently preferred embodiments of the invention and, together with the general description given above and the detailed description of the preferred methods and embodiments given below, serve to explain the principles of the invention.

FIG. 5A is a top, exploded view of the nerf bar assembly of FIG. 1, showing the length of the tubular member measured in inches.

FIG. 5B is a front view of the nerf bar assembly of FIG. 5A, showing the diameter of the tubular member measured in inches.

FIG. 6A is a top view of the nerf bar assembly of FIG. 5A, showing the the tubular member mounted to the support structure.

FIG. 6B is a front view of the nerf bar assembly of FIG. 6A.

DETAILED DESCRIPTION

Figure 1:
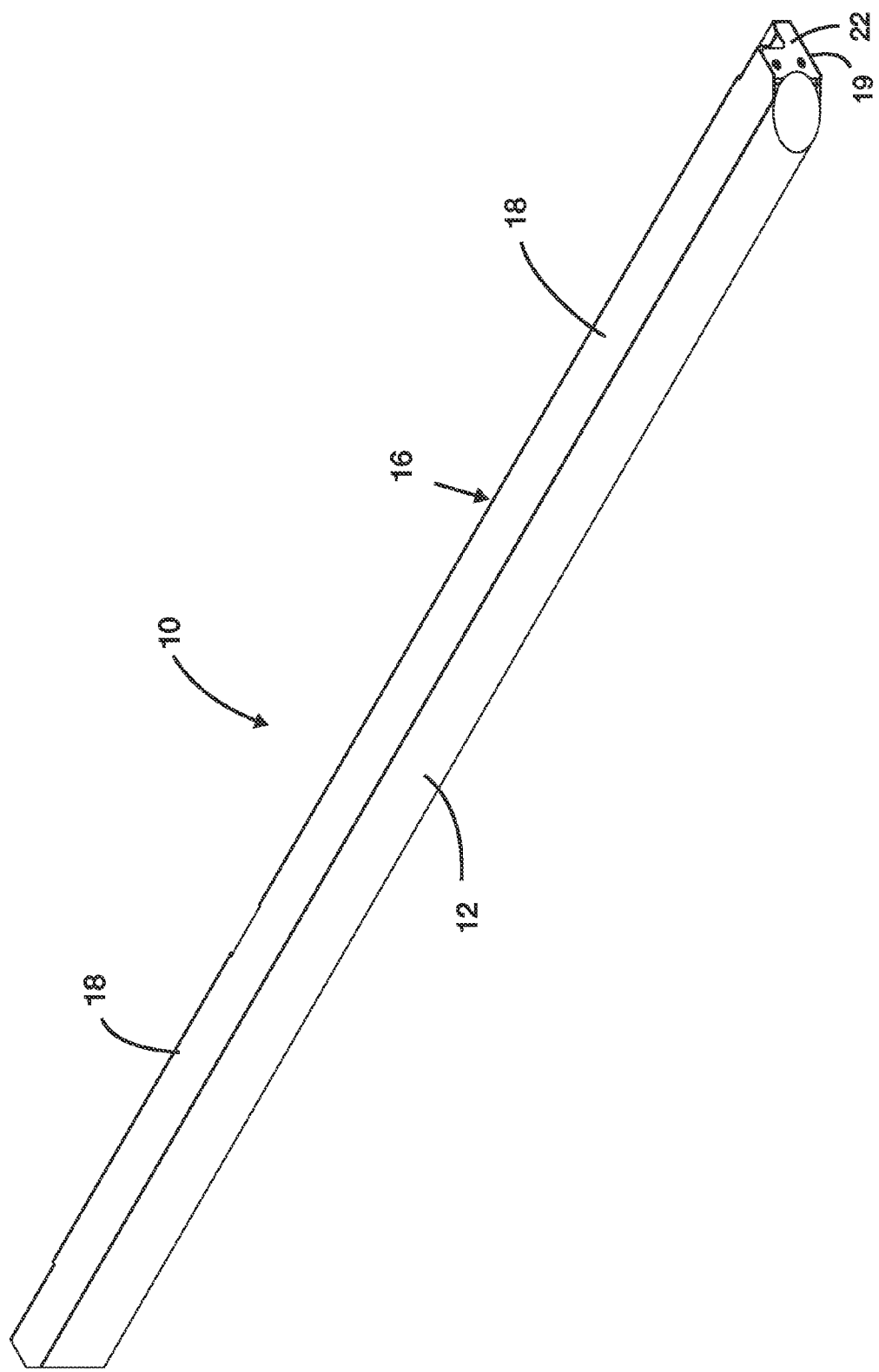
FIG. 1 is an outer top perspective view of one embodiment of a nerf bar assembly according to the present invention, showing the tubular member mounted to the support structure.
Figure 2:
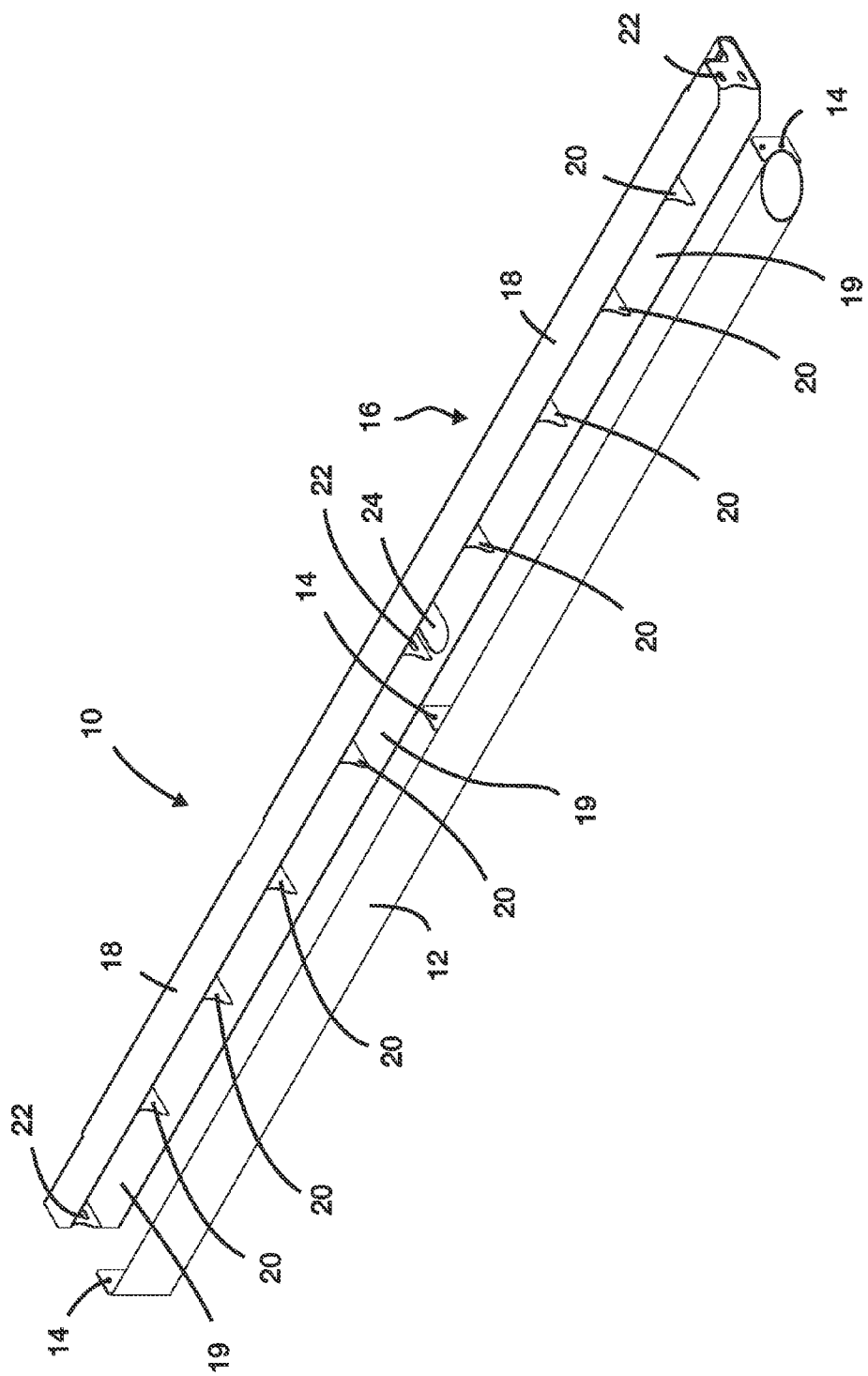
FIG. 2 is an outer top perspective exploded view of the nerf bar assembly of FIG. 1, revealing the channel formed by the support structure.
Figure 3:
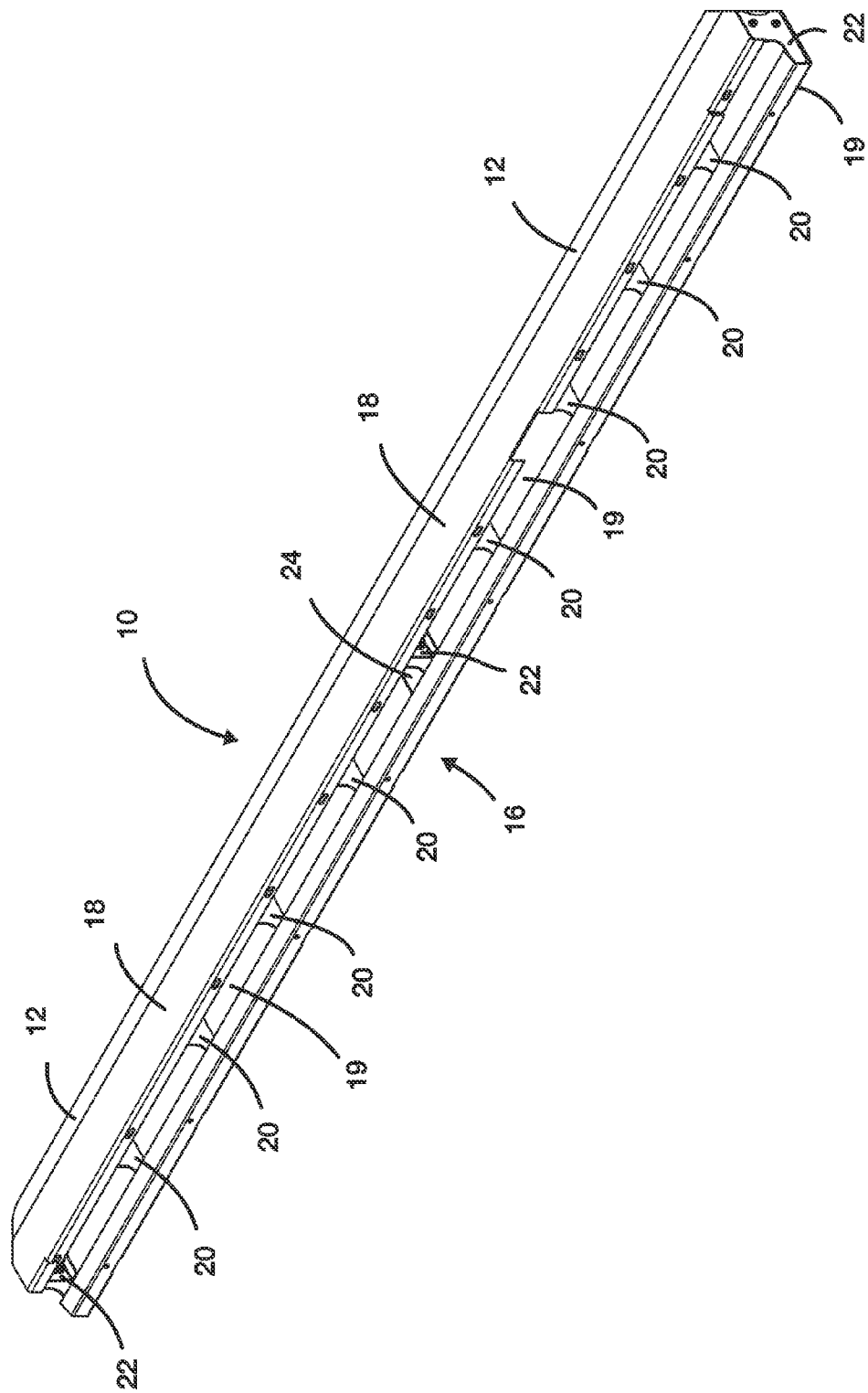
FIG. 3 is an inner top perspective view of the nerf bar assembly of FIG. 1.
Figure 4:
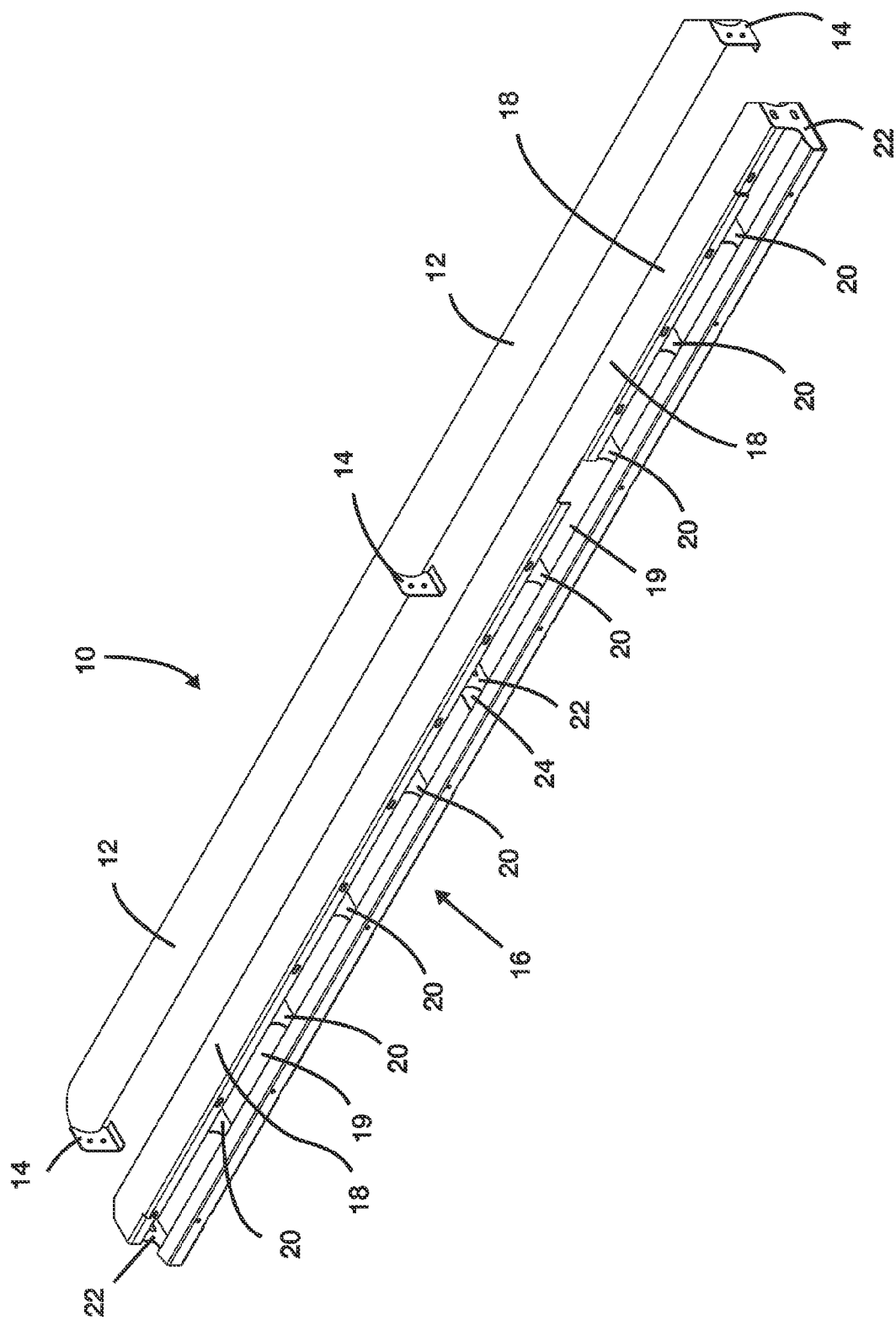
FIG. 4 is an inner top perspective exploded view of the nerf bar assembly of FIG. 3.
Figure 7:
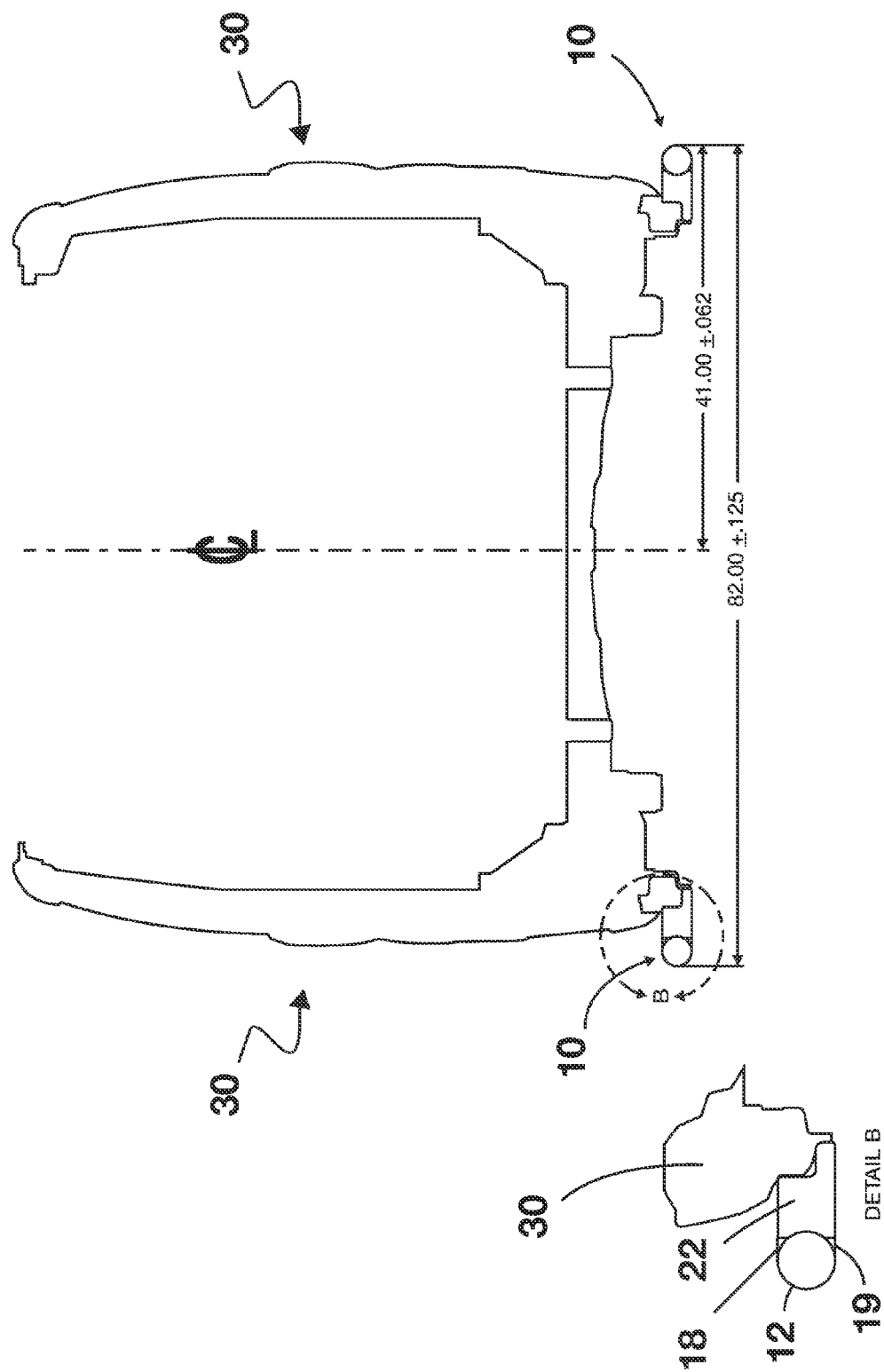
FIG. 7 is a cross-sectional end view of a Ford Transit unibody van showing the nerf bar assembly of FIG. 1 mounted to each side of the van body, and including a detailed view B showing how the nerf bar assembly is mounted to the van body. Dimensions shown in the figure are in inches.
Figure 8:
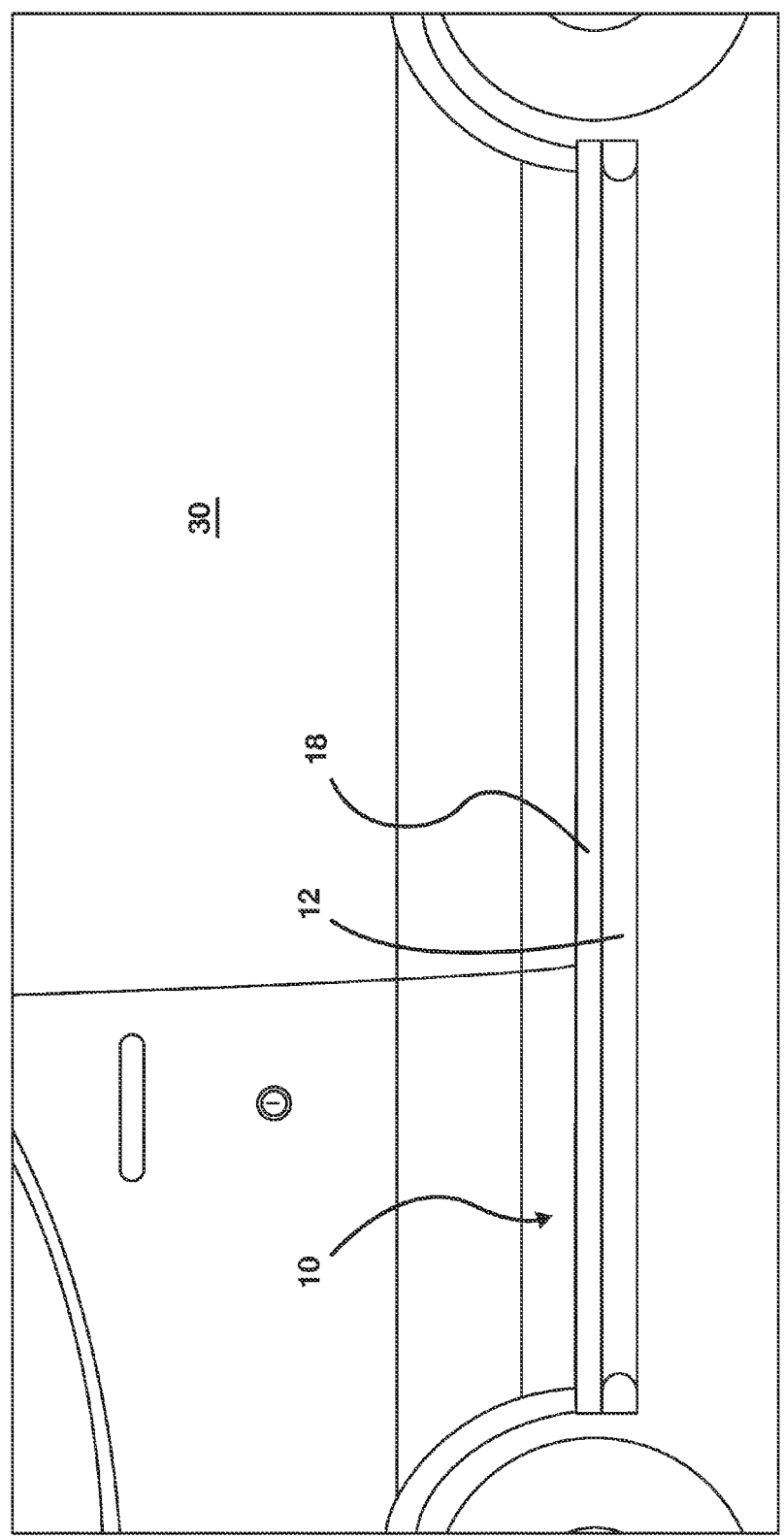
FIG. 8 is a side view of a Ford Transit unibody van with the nerf bar assembly of FIG. 1 mounted to the side of the van body.
Figure 9:
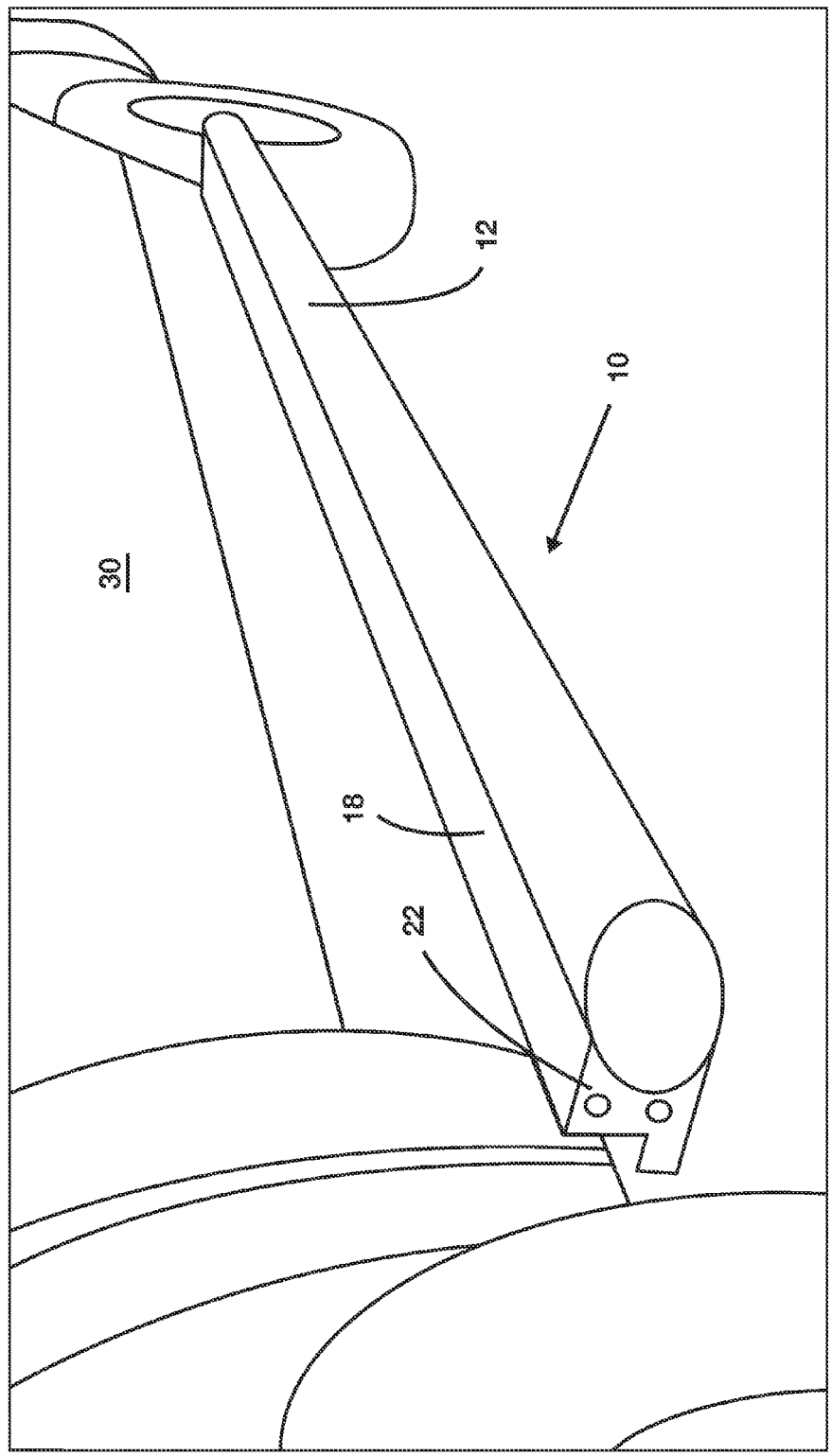
FIG. 9 is a front perspective view of the side of the van of FIG. 8.
Figure 10:
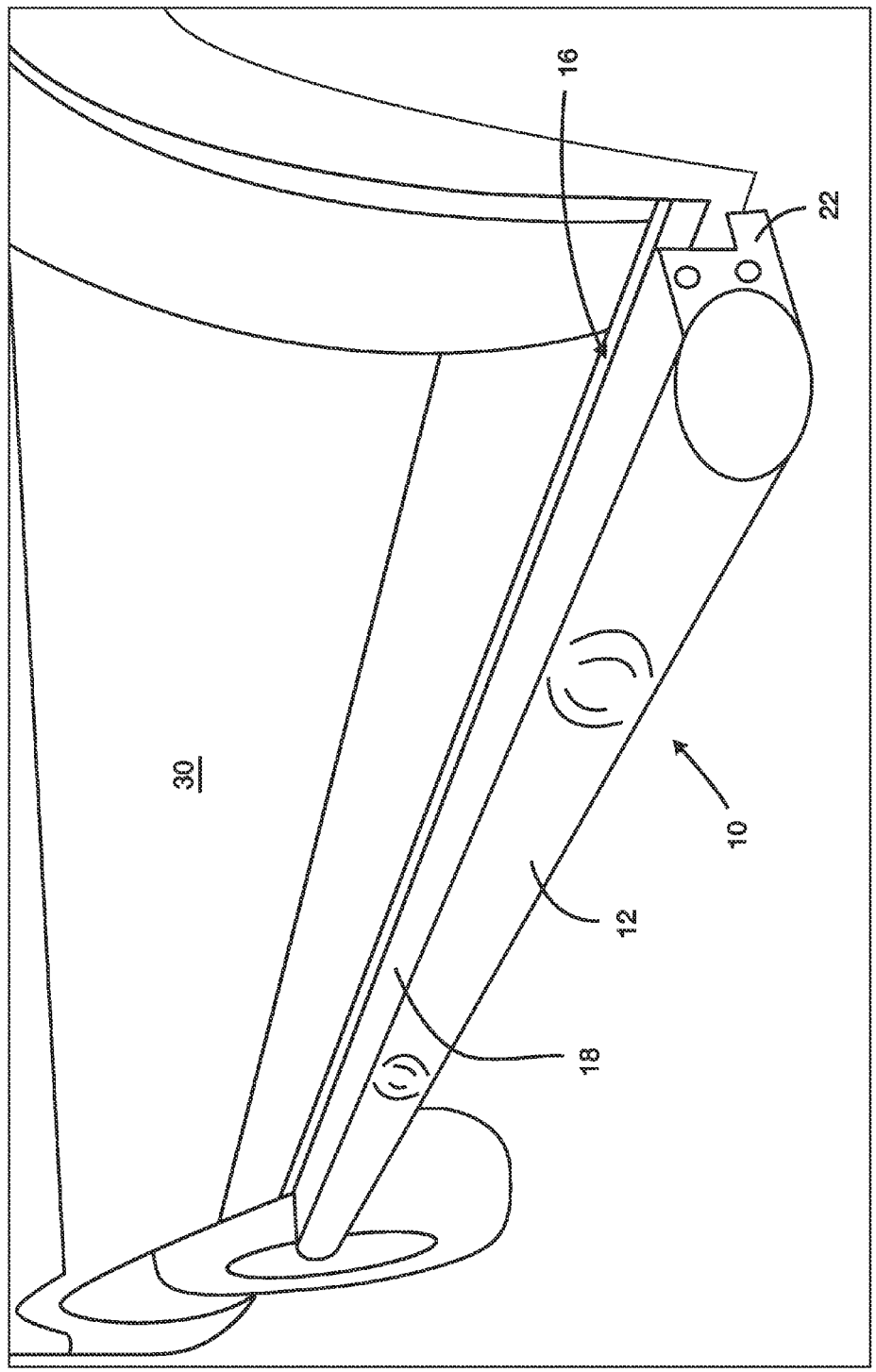
FIG. 10 is a perspective view of a prototype nerf bar assembly according to the present invention, showing dents in the tubular section resulting from test impacts to the tubular member during a stationary pole impact test.
Figure 11:
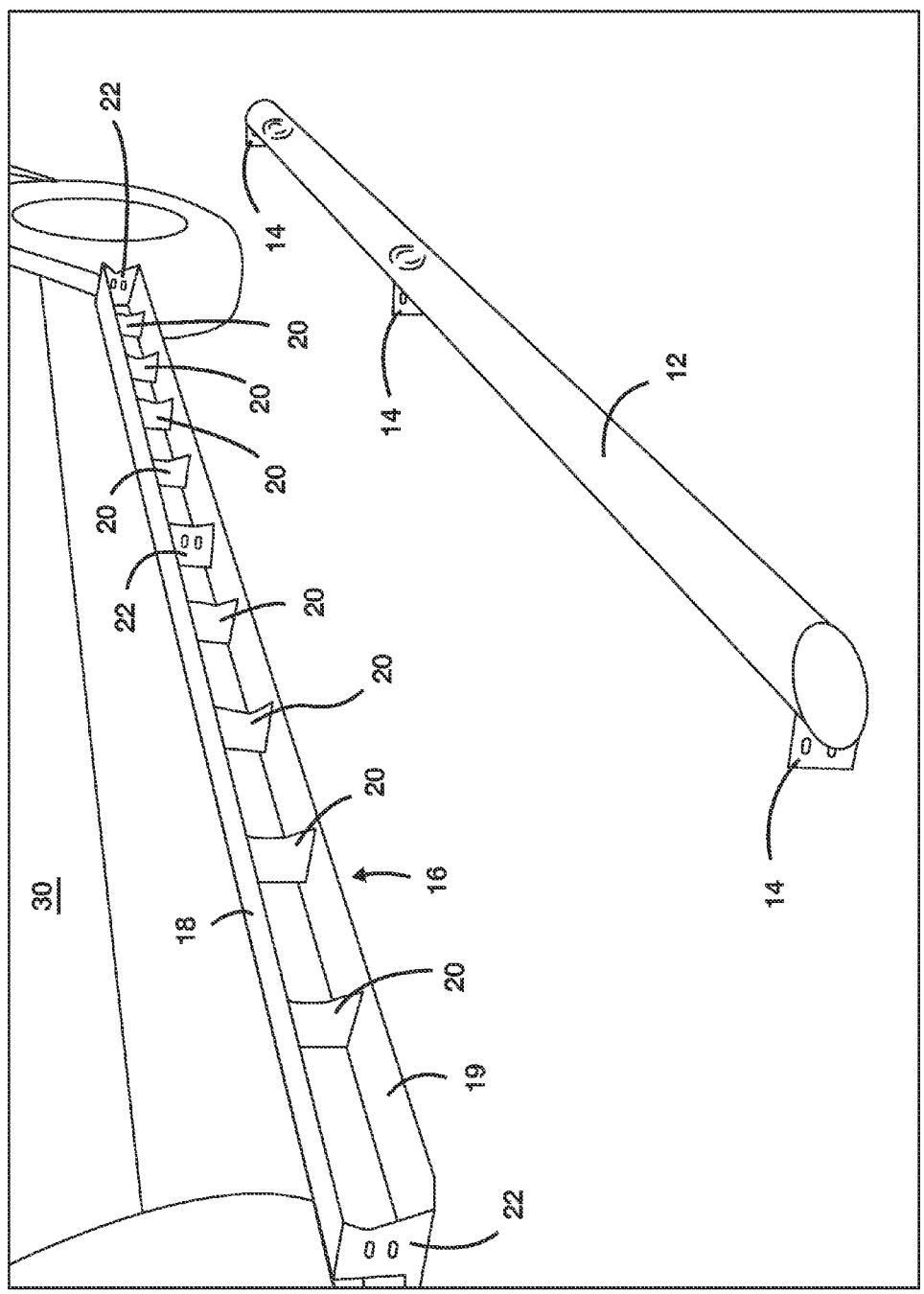
FIG. 11 is a perspective view of the prototype nerf bar assembly of FIG. 10, showing the dented tubular member removed and the lack of damage to the support structure.

Reference will now be made in more detail to presently preferred embodiments of the invention, as illustrated in the accompanying drawings. While the invention is described more fully with reference to these examples and drawings, the invention in its broader aspects is not limited to the specific details, representative devices, and illustrative examples shown and described. Rather, the description which follows is to be understood as a broad, teaching disclosure directed to persons of ordinary skill in the appropriate arts, and not as limiting upon the invention.

It will be appreciated that terms such as "upper," "inner," "outer," "vertical," "horizontal," "bottom," "below," "top," "side," "inwardly," "outwardly," "downwardly" and "lower" and other positionally descriptive terms used in this specification are used merely for ease of description and refer to the orientation of the referenced components as shown in the figures. It should be understood that any orientation of the components described herein is within the scope of the present invention. The term "generally" as used in this specification is defined as "being in general but not necessarily exactly or wholly that which is specified." For example, "generally perpendicular" is used herein to indicate components that are in general, but not necessarily exactly or wholly, perpendicular.

In the drawings, the reference numeral 10 designates a nerf bar assembly in accordance with the invention. As shown in FIGS. 1-6, one embodiment of the nerf bar assembly 10 includes a tubular member 12 and a plurality of mounting brackets 14 fixed to and projecting generally perpendicularly from the tubular member 12. A support structure 16 generally forms a channel and is adapted for mounting to the body of a vehicle body 30 having a unibody construction. The support structure 16 includes a channel top portion 18, a channel bottom portion 19, and a plurality of channel veins 20 attached to the channel top portion 18 and the channel bottom portion 19 and disposed within the channel. The support structure 16 also includes a plurality of support structure brackets 22 disposed within the channel and configured so that each of the plurality of tubular member mounting brackets 14 can be removably mounted to a corresponding one of the plurality of support structure brackets 22. The channel bottom portion 19 includes an opening 24 that provides access for mounting one of the tubular member brackets 14 to the corresponding support structure bracket 22.

Referring to FIGS. 7-9 and 12 the support structure 16 is mounted to a lower portion of the side of a unibody vehicle using existing holes in the unibody structure with one drill point. The channel top portion 18 is mounted using bolts inserted through holes formed in the channel top portion 18. The channel bottom portion 19 is mounted to the vehicle body 30 using bolts inserted through holes formed in the channel bottom portion 19. Upon reading this disclosure, it will be understood that any other suitable means may be used for mounting the support structure 16 to the vehicle body 30. For example, the channel bottom portion 19 can be mounted using one or more L-shaped brackets attached to the channel bottom portion 19 and bolted to the vehicle body 30.

Figure 12:
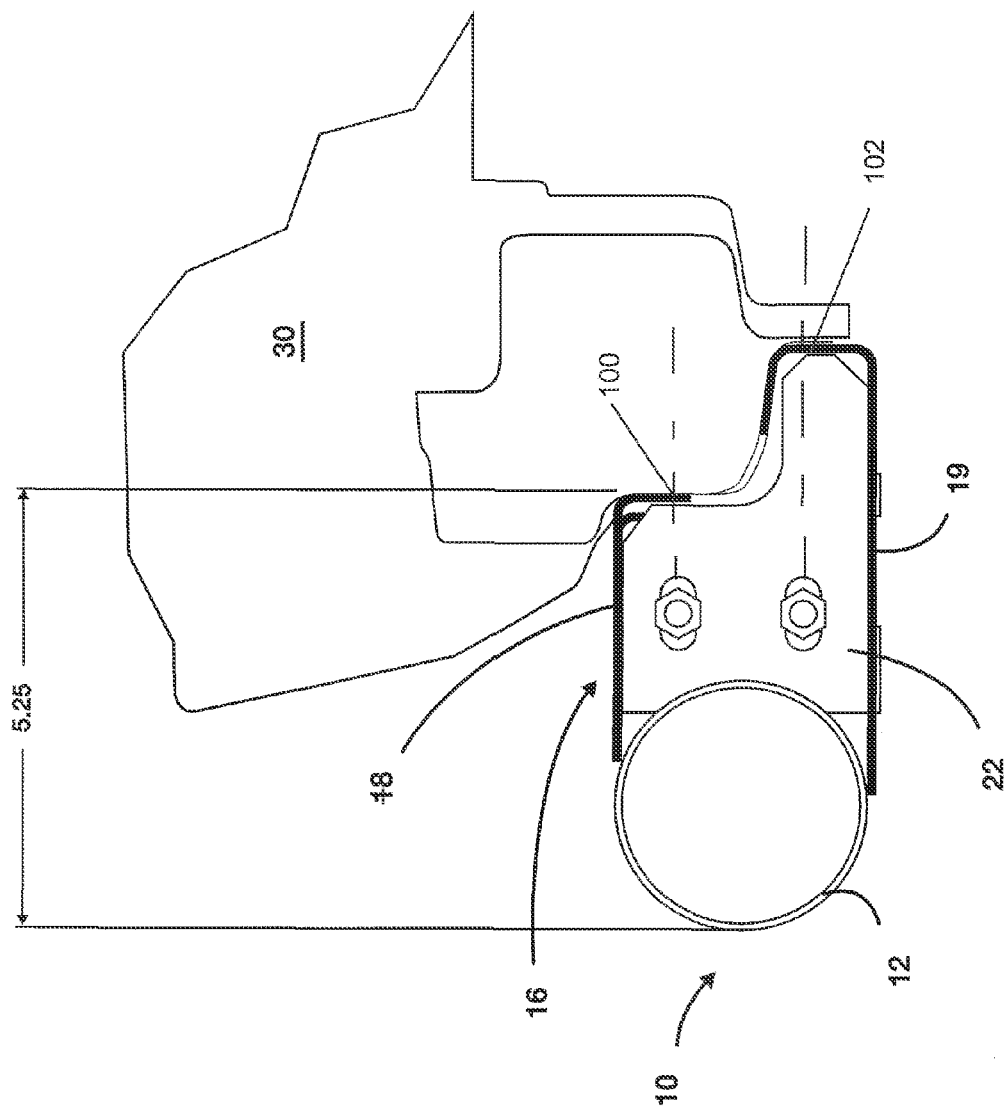
FIG. 12 is an enlarged view of detailed view B of FIG. 7, showing dimensions in inches.

When mounted to the vehicle body 30, the support structure 16 forms an outwardly-facing channel that extends along the side of the vehicle body 30 between the front and rear tires. FIG. 12 shows one embodiment of a nerf bar assembly 10 mounted to a Ford Transit unibody van. The channel top portion 18 is bolted to the vehicle body 30 at 12 locations 100 along the length of the body 30, and the channel bottom portion 19 is bolted to the vehicle body 30 at eight locations 102 along the length of the body 30. In the embodiment of FIG. 12, the tubular member 12 is mounted only about 5.25 inches from the point where the support structure 16 is attached to the vehicle body 30, which limits the amount of stress on the support structure 16 as well as the unibody structure. By mounting the support structure 16 to the vehicle body 30 in this manner, the integrity of the unibody structure is preserved.

The tubular member 12 is removably mounted to the support structure 16 by bolting each of the mounting brackets 14 to the corresponding support structure brackets 22. Preferably, the bolt holes in the mounting brackets 22 are slotted to allow for ease of installation and manufacturing tolerances. In this configuration, when the tubular member 12 impacts an object, such as a pole, the tubular member 12 acts as a sacrificial member that collapses and absorbs the impact before damage occurs to the support structure 16 or the vehicle body 30.

In one presently preferred embodiment, the tubular member 12 is made of steel having the following specification: 3"×0.065" Wall ERW Round Steel Tubing per ASTM A513, Type 1. The mounting brackets 14 and components of the support structure 16 are made of steel having the following material specification: 14 gauge (0.075") Steel Sheet per ASTM A-1011. The mounting brackets 14 are welded to the tubular member 12. The channel veins 20 and the support structure brackets 22 are welded to the channel top portion 18 and the channel bottom portion 19.

A prototype of a nerf bar assembly according to the present invention was constructed and installed on each of the driver side and passenger side of a Ford Transit Van, and was tested for strength and durability. The channel bottom portion 19 of the driver side nerf bar assembly was mounted using L-shaped mounting brackets that were bolted to the channel bottom portion 19 and to the vehicle body 30. The channel bottom portion 19 of the passenger side nerf bar assembly was mounted using bolts inserted directly through holes in the channel bottom portion 19. The tests included a static load test, a fatigue test and a stationary pole test.

Figure 15:
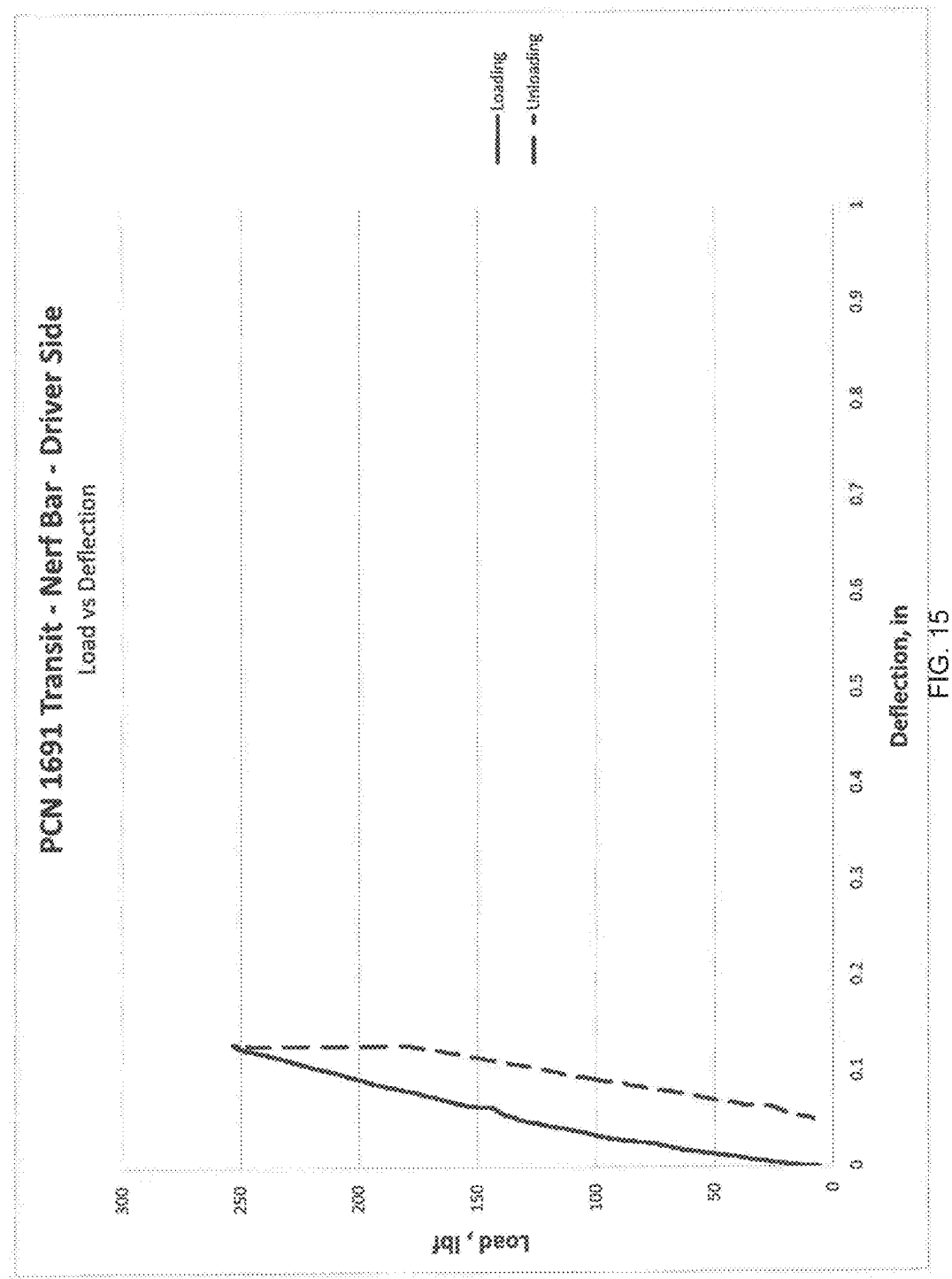
FIG. 15 is a graph showing load vs. displacement measurements taken during static load testing of the prototype nerf bar assembly installed on the driver side of a Ford Transit van according to the present invention.
Figure 16:
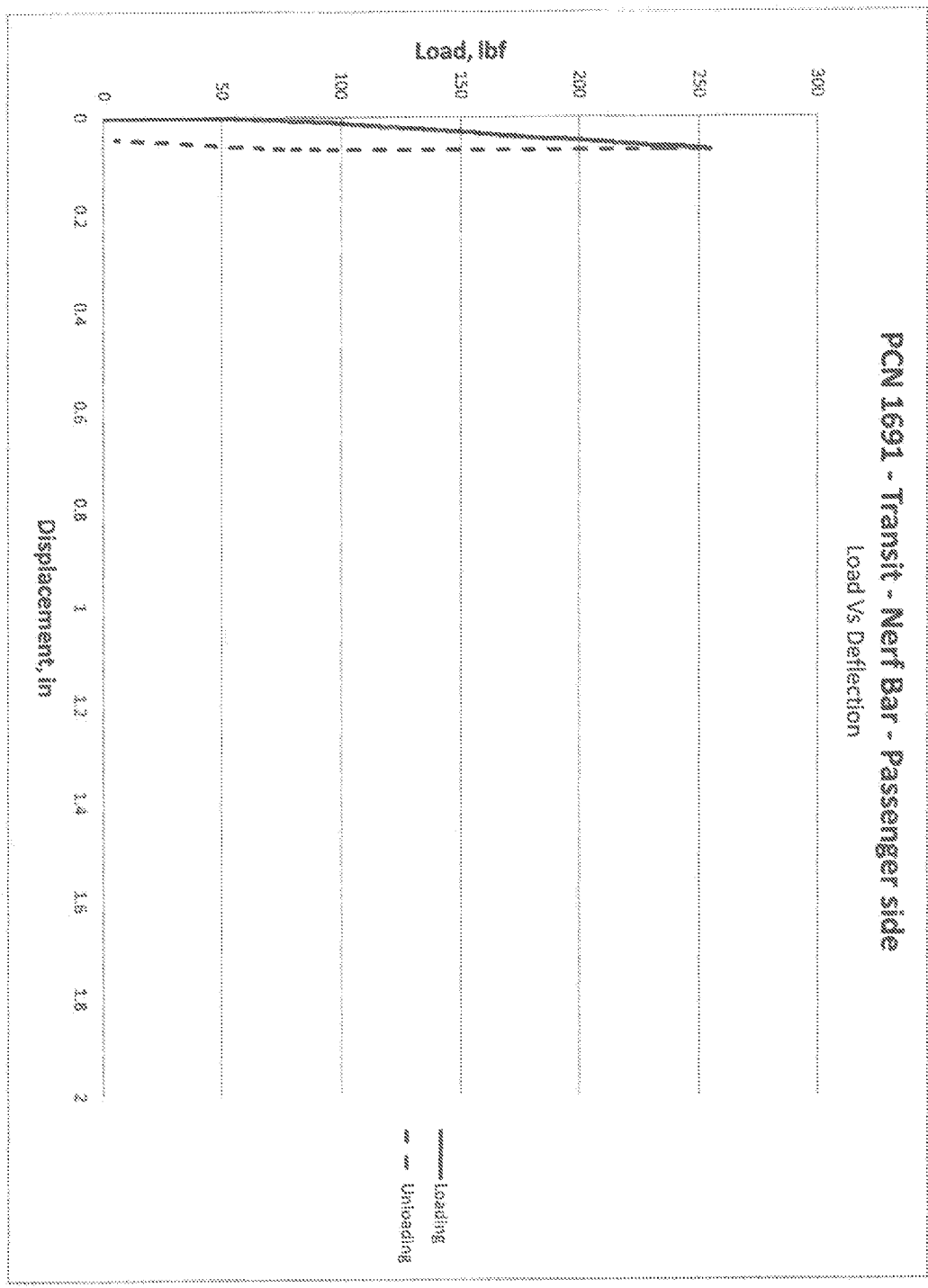
FIG. 16 is a graph showing load vs. displacement measurements taken during static load testing of the prototype nerf bar assembly installed on the passenger side of a Ford Transit van according to the present invention.

The static load test was performed by placing the driver side of the Transit van on jack stands so that the van's suspension did not function. An air cylinder with a 1000 lb load cell was set up to apply the load on the nerf bar assembly. The location for applying the force to the nerf bar was determined based on observing the foot position of people entering and exiting the van. A force of 250 lb. ft of torque was applied at a gradual rate. The displacement of the bar was measured during the test. FIG. 15 shows the load vs. displacement curve for the driver side nerf bar assembly, and FIG. 16 shows the load vs. displacement curve for the passenger side nerf bar assembly. As seen in FIGS. 15 and 16, the position of the nerf bar shifted only marginally (less than 1/16th inch) after the first static test. The static test results showed that there was marginally more deflection on the driver side than the passenger side at 250 lb. ft.

Figure 13:
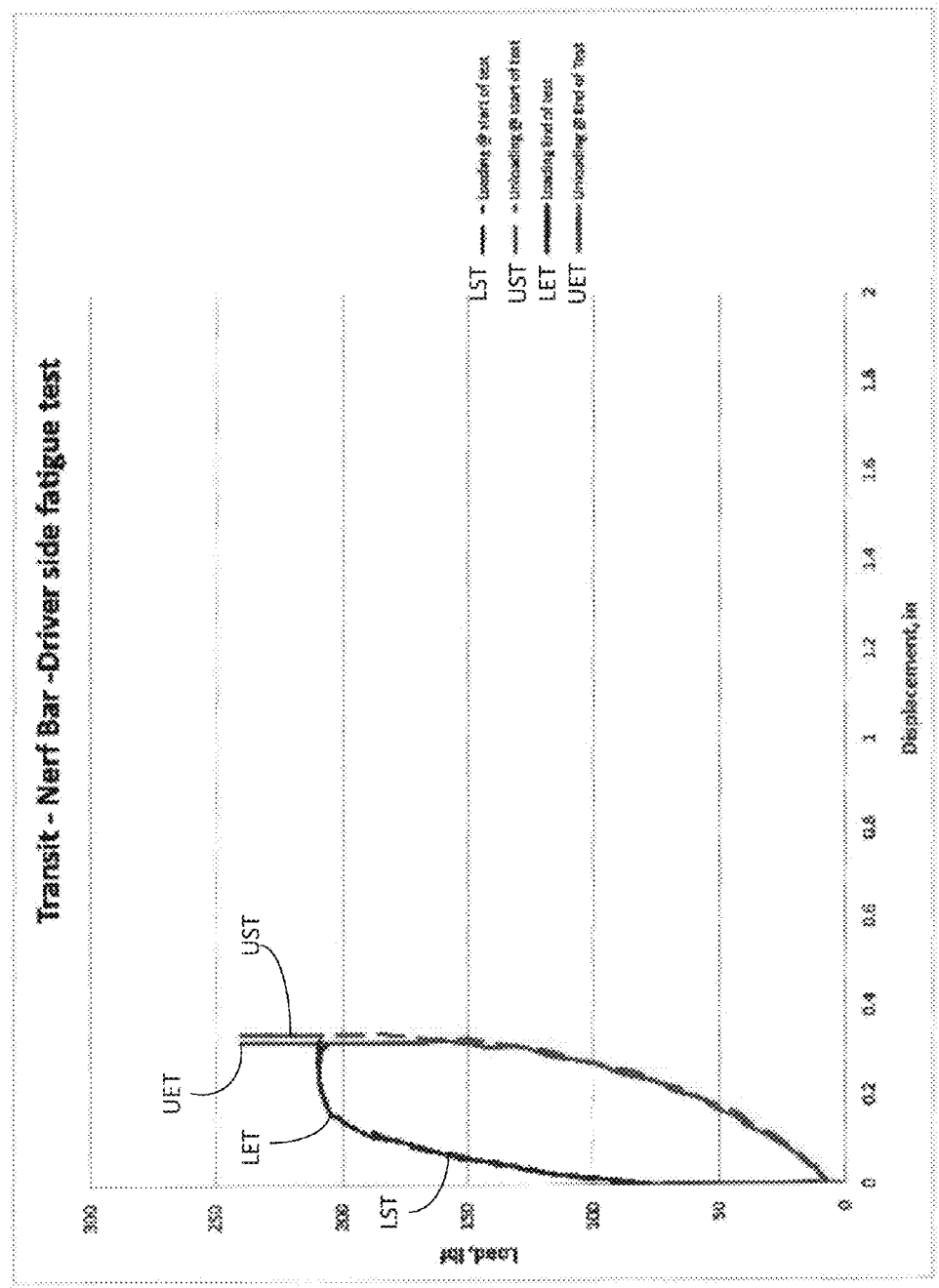
FIG. 13 is a graph showing load vs. displacement measurements taken during fatigue testing of a prototype nerf bar assembly installed on the passenger side of a Ford Transit van according to the present invention.
Figure 14:
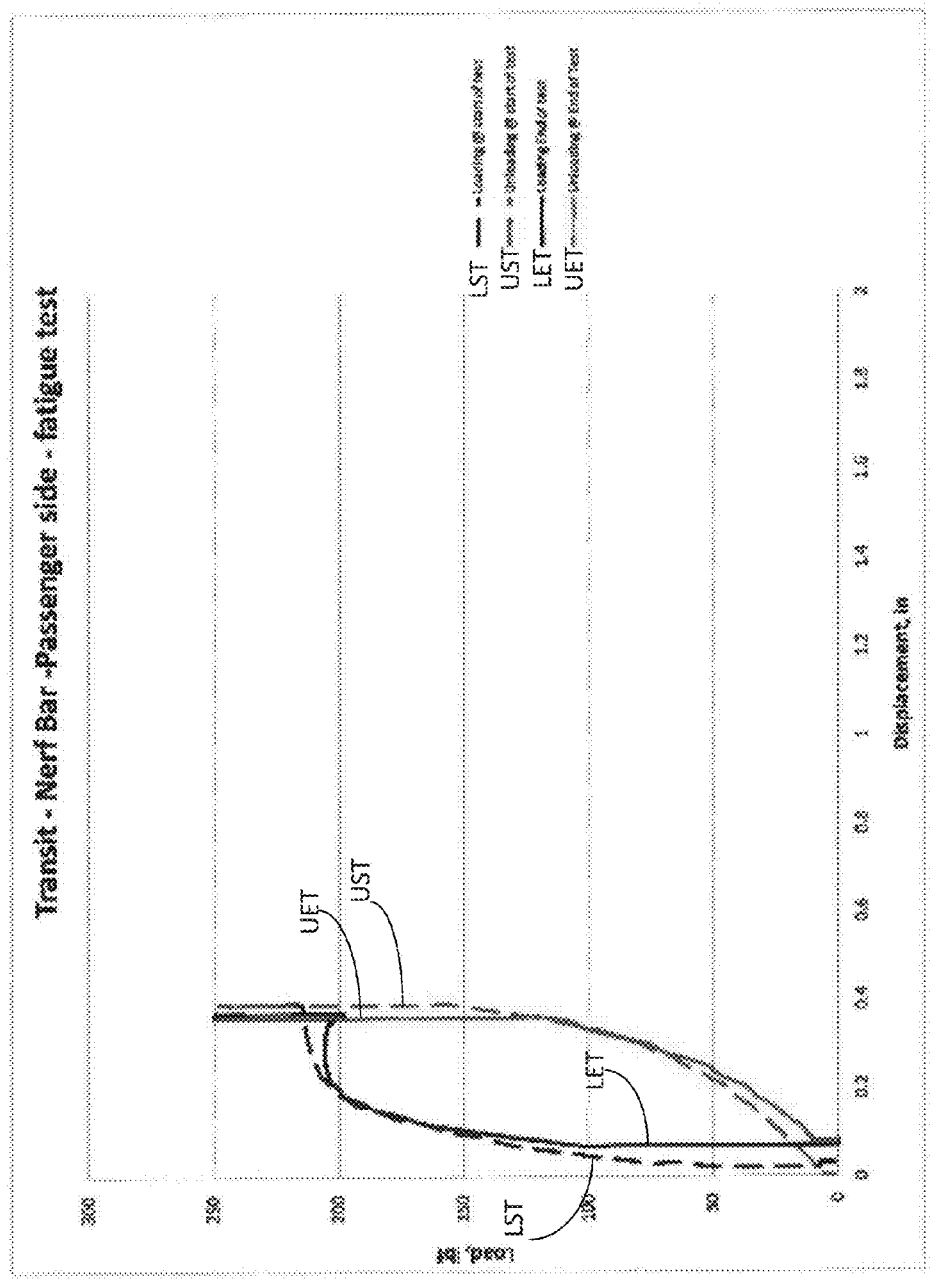
FIG. 14 is a graph showing load vs. displacement measurements taken during fatigue testing of the prototype nerf bar assembly installed on the driver side of a Ford Transit van according to the present invention.

The fatigue test of the prototype nerf bar assembly installed on each of the passenger and driver sides was performed using the static test fixture setup described above. A force of 225 lb. ft was applied at 4 seconds/cycle for 4000 cycles. Load and displacement was recorded at regular time intervals. The nerf bar assembly was inspected at the end of test, and there was no visual change. FIG. 13 shows a comparison of the load vs. displacement curves for the driver side nerf bar assembly, and FIG. 14 shows the load vs. displacement curve for the passenger side nerf bar assembly.

The stationary pole test was performed to test the prototype nerf bar assembly in a situation where the vehicle hits a stationary pole at a very slow speed. The test was performed by mounting a pole on an I-beam. The vehicle was parked in position with the wheels turned towards the pole. The vehicle was moved forward at a slow speed until it hit the pole. The test was performed with the nerf bar assembly mounted to each of the passenger side and the driver side of the van. After the test, the nerf bar assembly was disassembled and removed from the vehicle, and the both the nerf bar assembly and vehicle frame were inspected. As a result of this test, the tubular member of the nerf bar assembly was dented. The tubular member absorbed the impact force, and the support structure of the nerf bar assembly and the vehicle frame were not damaged.

From the foregoing, it can be seen that the apparatus of the present invention possesses numerous advantages. It can be used on vehicles of unibody construction to provide protection from damage to the vehicle body during a side-impact collision with an object such as a pole. The nerf bar of the present invention can be relatively easily removed and replaced if the bar is damaged. It can be mounted to the body of a vehicle having unibody construction with minimal modification or drilling of the body so as not to affect the integrity of the body. The nerf bar of the present invention is not left or right-side specific, so that it can be used on either side of a vehicle without modification to the nerf bar assembly.

Upon reading this disclosure, additional advantages and modifications will readily occur to those skilled in the art. Therefore, the invention in its broader aspects is not limited to the specific details, representative devices, and illustrative examples shown and described. Accordingly, departures may be made from such details without departing from the spirit or scope of the general inventive concept.

What is claimed is:

1. A nerf bar assembly for mounting to the side of a vehicle having a unibody construction, the nerf bar assembly comprising:
    a tubular member comprising a tubular section and a plurality of mounting brackets fixed to and projecting generally perpendicularly from the tubular section;
    a support structure generally forming a channel configured for mounting to the body of a vehicle having a unibody construction;
    wherein the support structure includes a channel top portion, a channel bottom portion, and a plurality of channel veins attached to the channel top portion and the channel bottom portion and disposed within the channel; and
    wherein the support structure includes a plurality of support structure brackets disposed within the channel and configured so that each of the plurality of tubular member mounting brackets can be mounted to a corresponding one of the plurality of support structure brackets.

2. The nerf bar assembly of claim 1 wherein each of the plurality of tubular member mounting brackets can be removably mounted to the corresponding one of the plurality of support structure brackets.

3. The nerf bar assembly of claim 1 wherein the assembly is configured so that it can be mounted to either side of the vehicle body without modifying the nerf bar assembly.

4. The nerf bar assembly of claim 1 wherein the assembly is configured so that when the tubular member impacts an object, the tubular member can collapse and absorb the impact before damage occurs to the support structure or the vehicle body.

5. The nerf bar assembly of claim 1 wherein the tubular member comprises steel tubing that complies with an ASTM A513, Type 1, specification.

6. The nerf bar assembly of claim 1 wherein the mounting brackets and the support structure comprise sheet steel that complies with an ASTM A-1011 specification.

7. The nerf bar assembly of claim 1 wherein the assembly is configured so that when the support structure is attached to the vehicle body and the tubular member is mounted to the support structure, the outermost portion of the tubular member is disposed less than about six inches outward from the outermost point where the support structure attaches to the vehicle body.

8. A nerf bar assembly for mounting to the side of a vehicle having a unibody construction, the nerf bar assembly comprising:
   a tubular member;
   a support structure defining a longitudinal channel and configured for mounting to the body of a vehicle having a unibody construction;
   wherein the support structure includes a plurality of channel veins disposed within and transverse to the channel and spaced apart along a length of the channel; and
   wherein the tubular member is configured for mounting to the support structure so that a portion of the tubular member is disposed within the channel and adjacent to the channel veins.

9. The nerf bar assembly of claim 8 wherein the tubular member is removably mounted to the support structure.

10. The nerf bar assembly of claim 8 wherein:
    the tubular member includes a plurality of mounting brackets fixed to and projecting generally perpendicularly from a tubular section of the tubular member; and
    wherein the support structure includes a plurality of support structure brackets disposed within the channel and configured so that each of the plurality of tubular member mounting brackets can be removably mounted to a corresponding one of the plurality of support structure brackets.

11. The nerf bar assembly of claim 8 wherein the assembly is configured so that it can be mounted to either side of the vehicle body without modifying the nerf bar assembly.

12. The nerf bar assembly of claim 8 wherein the assembly is configured so that when the tubular member impacts an object, the tubular member can collapse and absorb the impact before damage occurs to the support structure or the vehicle body.

13. The nerf bar assembly of claim 8 wherein the tubular member comprises steel tubing that complies with an ASTM A513, Type 1, specification.

14. The nerf bar assembly of claim 8 wherein the support structure comprise sheet steel that complies with an ASTM A-1011 specification.

15. The nerf bar assembly of claim 8 wherein when the support structure is attached to the vehicle body and the tubular member is mounted to the support structure, the outermost portion of the tubular member is disposed less than about six inches outward from the outermost point where the support structure attaches to the vehicle body.

16. A nerf bar assembly for mounting to the side of a vehicle having a unibody construction, the nerf bar assembly comprising:
    a support structure defining a longitudinal channel and configured for mounting to the body of a vehicle having a unibody construction;
    wherein the support structure includes at least one channel vein disposed within and transverse to the channel between opposing ends of the channel; and
    wherein the support structure is configured for mounting a tubular member to the support structure so that a portion of the tubular member is disposed within the channel and adjacent to the channel vein.

17. The nerf bar assembly of claim 16 wherein the tubular member is configured for mounting to the support structure so that a portion of the tubular member is disposed within the channel and adjacent the channel vein.

18. The nerf bar assembly of claim 16 wherein the support structure is configured so that the tubular member can be removably mounted to the support structure.

19. The nerf bar assembly of claim 16 wherein the support structure includes a plurality of support structure brackets disposed within the channel and configured so that each of the plurality of support structure brackets can be mounted to a corresponding one of a plurality of mounting brackets of the tubular member.

20. The nerf bar assembly of claim 16 wherein the assembly is configured so that it can be mounted to either side of the vehicle body without modifying the nerf bar assembly.

21. A nerf bar assembly for mounting to the side of a vehicle having a unibody construction, the nerf bar assembly comprising:
    a tubular member;
    a support structure defining a longitudinal channel and configured for mounting to the body of a vehicle having a unibody construction;
    wherein the support structure includes at least one channel vein disposed within the channel; and
    wherein the tubular member is configured for mounting to the support structure so that a portion of the tubular member is disposed within the channel and adjacent the channel vein;
    wherein the tubular member includes a plurality of mounting brackets fixed to and projecting generally perpendicularly from a tubular section of the tubular member; and
    wherein the support structure includes a plurality of support structure brackets disposed within the channel and configured so that each of the plurality of tubular member mounting brackets can be removably mounted to a corresponding one of the plurality of support structure brackets.

22. A nerf bar assembly for mounting to the side of a vehicle having a unibody construction, the nerf bar assembly comprising:
    a support structure defining a longitudinal channel and configured for mounting to the body of a vehicle having a unibody construction;
    wherein the support structure includes at least one channel vein disposed within the channel;
    wherein the support structure is configured for mounting a tubular member to the support structure so that a portion of the tubular member is disposed within the channel and adjacent the channel vein; and
    wherein the support structure includes a plurality of support structure brackets disposed within the channel and configured so that each of the plurality of support structure brackets can be mounted to a corresponding one of a plurality of mounting brackets of the tubular member.

* * * * *